2,910,287
WEIGHING BALANCE

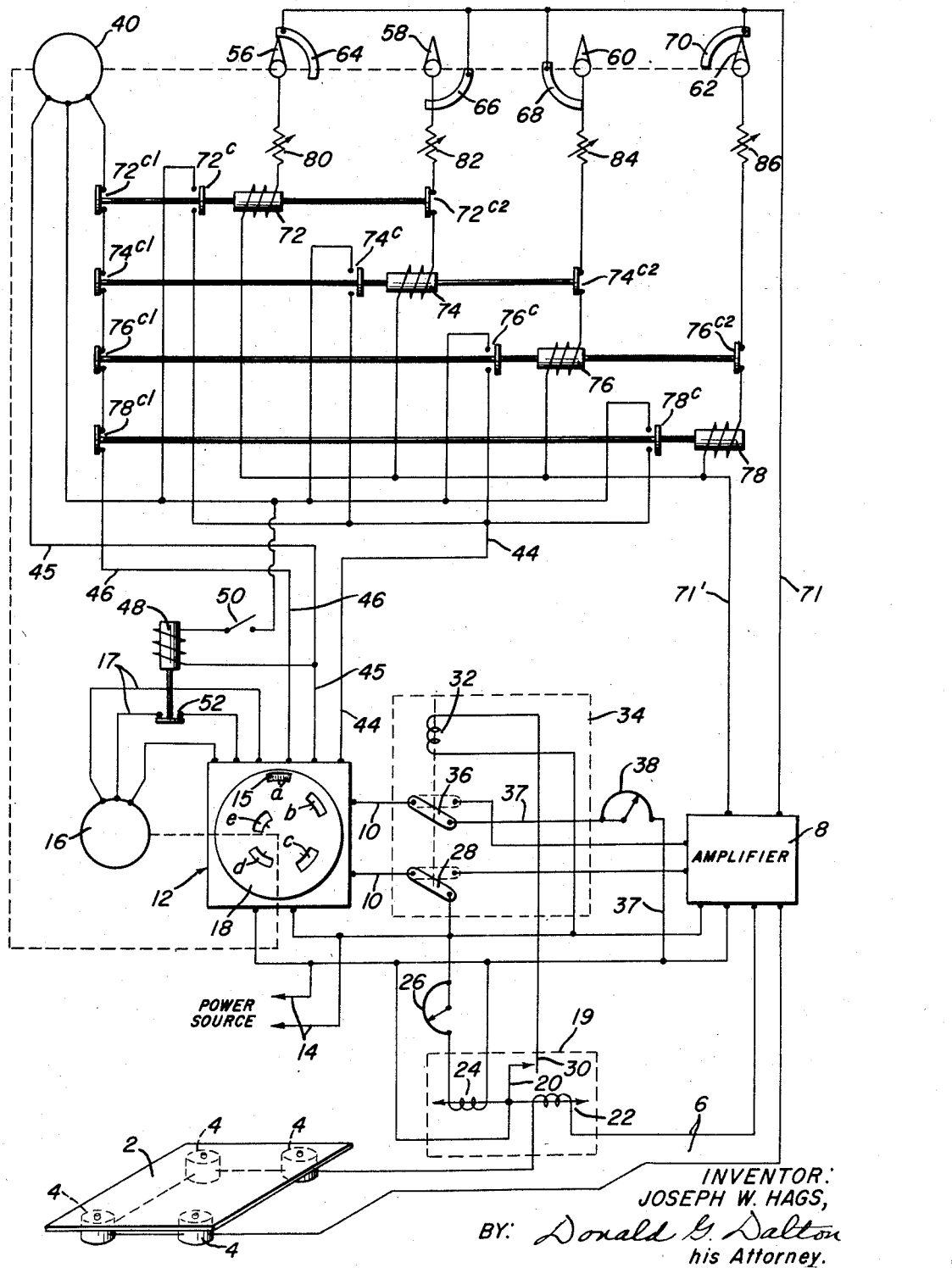

Joseph W. Hags, Irwin, Pa., assignor to United States Steel Corporation, a corporation of New Jersey Application December 15, 1955, Serial No. 553,266

7 Claims. (Cl. 265—27)

This invention relates to weighing balances and more particularly to electric balances having more than one range. In the balances used prior to my invention the amount of time necessary to perform the weighing operation is unduly long. One reason for this is the amount of time it takes the indicator to travel from its zero position to the position indicating or recording the weight. Another time-consuming operation is the change from one range to another in balances having multi-ranges. In such balances the indicator must travel from zero to the maximum position on the lowest range and must remain there until the proper range is selected, either automatically or manually. The range changing sequence proceeds from the lowest range to the second range, then to the third range and so on until the proper range is selected, at which time the pointer must return from the maximum position to the position corresponding to the weight of the load. For example, in indicating a weight of 81% full capacity on a typical balance having five ranges and requiring five seconds for the indicator to travel from end to end of any range and one second for the range changing mechanism to change from one range to another it requires five seconds to travel from zero position to the maximum position of the lowest range, four seconds to change through the intermediate ranges to the highest range and four and three-quarter seconds to travel 95% of the distance toward the minimum end of the highest range to the position corresponding to 81% of full capacity. Thus, the total time consumed is thirteen and three-quarter seconds.

It is therefore an object of my invention to provide electrical balances having means incorporated therewith for reducing the operating time thereof.

This and other objects will be more apparent after referring to the following specification and attached drawing, in which the single figure is a schematic diagram showing the electrical circuits incorporated in the balance.

Referring more particularly to the drawing, reference numeral 2 indicates a balance platform having four load cells 4 therebeneath. The load cells 4 pass a current which is a function of the load on the balance. The current flows through the lines 6—6 to an amplifier 8 where it is amplified and applied through the leads 10—10 to an indicating or recording instrument 12. Power for operating the amplifier 8 and instrument 12 is supplied from power lines 14—14. The instrument 12 has an indicator scale 15 which is mechanically connected to be driven by motor 16. Indicator scale 15 is provided with five ranges for indicating five different ranges of weights. Power for moving motor 16 is supplied through wires 17. A scale mask or indicator 18 is arranged over the indicator scale 15 and has five openings $a$, $b$, $c$, $d$ and $e$ arranged around its circumference in such a manner that each opening will be over one of the ranges. The weight is indicated at the center of the opening. The apparatus so far described is that of a standard electric or electronic balance. In order to reduce the time required for the indicator scale 15 to travel to the desired position means are provided for prepositioning the arm or scale 15. In many instances the loads to be weighed will fall within a fairly narrow range in which case the indicator scale 15 will be positioned approximately at the center of the range. In those cases where the loads to be weighed are variable within wide ranges, the indicator scale 15 may be positioned at the center of its range so that it will never have to travel more than one-half the length of the scale. In order to accomplish this purpose I provide a balancing relay 19 having a movable armature 20 and two coils 22 and 24. The coil 22 is arranged in one of the wires 6 leading to the amplifier 8. The other coil 24 has one side connected to one of the wires 14 and the other side connected in series with an adjustable rheostat 26 to the other of wires 14. The armature 20 has one end connected to one of the wires 14 and its other end connected through contact 30 and coil 32 of zero positioning relay 34 to the other wire 14. The relay 34 has two contacts 28 and 36. The contact 36 may be positioned as shown so as to be connected by wire 37 to one of the wires 14 through zero positioning rheostat 38 or as described hereinafter.

The operation of this part of my device is as follows. With no load on the platform 2 the rheostat 26 is adjusted so that the magnetic pull of coil 24 will be equal and opposite to that of coil 22, thus maintaining the armature 20 out of contact with its contact 30. The coil 24 and its circuit could be replaced by a balancing spring of sufficient strength to keep contact 30 open until a load is applied to the scale. As long as the contacts of balancing relay 19 are open the operating coil 32 of zero positioning relay 34 is deenergized and the contacts 28 and 36 thereof will remain in the open position shown. Under these conditions a position maintaining voltage is connected to the instrument 12 from power lines 14 through line 37, zero positioning rheostat 38, contact 36 and lead 10. By adjusting the zero positioning rheostat 38 the indicator 15 can be moved to any desired position and will remain in that position as long as there is no load on the platform. When a load is placed on the platform the current increases through the load cells 4 and coil 22. This increases the magnetic pull on the coil 22 and closes contact 30 thereby energizing coil 32. Energization of coil 32 moves contacts 28 and 36 from the full line position shown to the broken line position, thus completing the circuit from the amplifier 8 through wires 10 to the instrument 12 in which position the instrument 12 will be connected to the normal weighing circuit and will indicate or record the weight of the load. Under the circumstances mentioned above, it will require a maximum of two and one-half seconds for the indicator 15 to travel to the position where it will indicate the weight of the load on the balance. The above described arrangement may also be used with a single range balance in which case the multi-range indicator scale 15 and indicator mask 18 will be replaced by a single scale and indicator.

To decrease the amount of time necessary to change from one range to another the following apparatus is used. A reversible range changing motor 40 is mechanically connected to the scale mask 18 in the usual manner. Three wires 44, 45 and 46, which are connected to the indicating instrument 12, supply power to the range changing motor 40. The range changing motor also acts to change the resistance of the measuring circuit of the instrument 12 so that the correct load will be indicated thereon regardless of which range is being used. Wire 44 functions in conjunction with wire 45 to cause the motor 40 to operate toward a higher position and wire 46 functions in conjunction with wire 45 to operate the motor 40 toward a lower direction. A relay coil 48 is connected across the wires 44 and 45 and a switch 50 is provided in this circuit to control flow of current therethrough. Relay coil 48 has a normally closed contact 52 arranged in the leads 17. The motor 40 is mechanically connected to cam followers 56, 58, 60 and 62 which are adapted to contact cams 64, 66, 68 and 70, respectively. One side of each of the cams 64, 66, 68 and 70 is connected to wire 71. Cam followers 56, 58, 60 and 62 are connected to wire 71' in series with relay coils 72, 74, 76 and 78, respectively. Adjustable resistors 80, 82, 84 and 86 are also connected in series with the cam followers 56, 58, 60 and 62, respectively. The coil 72 is provided with normally open contacts 72C and normally closed contacts 72C1 and 72C2. Relay coil 74 has normally open contacts 74C and normally closed contacts 74C1 and 74C2. Coil 76 has normally open contacts 76C and normally closed contacts 76C1 and 76C2. Coil 78 has normally open contacts 78C and normally closed contact 78C1. Contacts 72C1, 74C1, 76C1 and 78C1 are connected in series in the line 46. Contacts 72C, 74C, 76C and 78C are connected in parallel to each other in the lead 44.

The operation of this device is as follows. When a weight is placed on the balance 2 the amplified voltage from amplifier 8 will pass through the leads 71 and 71', coil 72, resistor 80, cam follower 56 and cam 64. The resistor 80 is set so that sufficient current will flow through the relay coil 72 to operate the same when the weight on the balance is greater than that which can be indicated on the first scale of the instrument 12. Energization of relay coil 72 will close contact 72C and open contacts 72C1 and 72C2. Opening contact 72C1 will prevent operation of motor 40 in the lowering direction. Closing of contacts 72C will complete the circuit to the motor 40 to cause it to operate to move cam followers 56, 58, 60 and 62 in a clockwise direction. The cam tracks 64 and 66 are arranged in overlapping relationship so that as cam follower 56 leaves cam track 64 cam follower 58 will contact cam track 66. When cam follower 58 contacts cam track 66 a circuit will be connected through relay coil 74 as soon as follower 56 leaves cam 64, thus deenergizing relay coil 72 to close contacts 72C2. Adjustable resistor 82 is previously adjusted so that coil 74 will only operate if the load on the balance is greater than that which can be weighed on the first two ranges thereof. Energization of coil 74 under those circumstances will operate to close contacts 74C and open contacts 74C1 and 74C2. This will operate motor 40 to cause the cam followers to move through another 90°. Cam tracks 66 and 68 overlap so that cam follower 60 will contact cam track 68 before cam follower 58 leaves cam track 66. When cam follower 58 leaves cam track 66 coil 74 will be deenergized thus opening contacts 74C and closing contacts 74C1 and 74C2. In the meantime, since cam follower 60 has contacted cam track 68, the circuit is completed through coil 76. This closes contact 76C and opens contact 76C1 and 76C2. The motor 40 is energized through contact 76C and continues to move through another 90° at which time cam follower 60 will have left cam track 68 and cam follower 62 will have contacted cam track 70. Cam tracks 68 and 70 overlap in the same manner as the other cam tracks overlap. Resistor 84 is previously adjusted so that relay coil 76 will move its contacts only if the load on the balance is greater than that which can be weighed on the first three ranges thereof. When cam follower 60 leaves cam track 68, coil 76 is deenergized thus closing contacts 76C1 and 76C2 and opening contacts 76C. After contact 76C2 is closed and cam follower 62 is contacting cam track 70, relay coil 78 will be energized thus closing contacts 78C and opening contacts 78C1. This causes the range changing motor 40 to move the various cams until they return to the position shown. The indicator scale 15 will then move to indicate the weight of the load on the scale. Since switch 50 is closed coil 48 will be energized as long as the range changing motor 40 has power applied thereto to operate the same. Energization of coil 48 opens contact 52, thus keeping the motor 16 from operating. This permits the indicating scale 15 to be placed at the desired position in the manner described above where it will remain until the correct range has been moved to position. When the load is removed from the balance the range changing motor 40 will be energized through contacts 72C1, 74C1, 76C1 and 78C1 to return the cam followers to their original position.

While one embodiment of my invention has been shown and described it will be apparent that other adaptations and modifications may be made without departing from the the scope of the following claims.

I claim:

1. In an electric balance having means for passing a current proportional to the weight applied to the balance, an indicating instrument having a scale and an indicator associated therewith, an amplifier, a circuit for delivering the said current to said amplifier, a second circuit for delivering the output of said amplifier to said indicating instrument, the combination including a relay coil in said first named circuit having a normally open contact, a third circuit including said contact and a second relay coil in series, a two-position contact operable by said second relay coil, said two-position contact being in said second circuit and being adapted to complete said second circuit when the second coil is energized, and a fourth circuit including a positioning rheostat and said two-position contact in series, said two-position contact completing a circuit to said instrument when sad second coil is energized to cause said indicator and scale to indicate the weight on said balance.

2. In an electric balance having means for passing a current proportional to the weight applied to the balance, an indicating instrument having a multi-range scale and an indicator associated therewith, a circuit for delivering the said current to the indicating instrument, a range changing motor, a plurality of cam followers connected to said motor, a cam associated with each of said cam followers, each of said cam followers contacting its associated cam over a portion of its travel with successive cam followers contacting their associated cams at spaced intervals as the motor rotates, a second circuit for supplying power to said motor, and a third circuit including said cams and associated cam followers connected in parallel, the combination including means in said third circuit for operating said motor to rotate said cam followers and move from range to range on said indicating instrument successively until the correct range is selected.

3. In an electric balance having means for passing a current proportional to the weight applied to the balance, an indicating instrument having a multi-range scale and a mask indicator associated therewith, a circuit for delivering the said current to the indicating instrument, a reversible range changing motor for moving said mask indicator, a plurality of cam followers connected to said motor, a cam associated with each of said cam followers, each of said cam followers contacting its associated cam over a portion of its travel with successive cam followers contacting their associated cams at spaced intervals as the motor rotates, a three-wire circuit between said instrument and said motor, the first of said wires being energized to move said motor in a direction to select a lower range, the second of said wires being energized to move said motor in the opposite direction, the third of said wires being common to complete a circuit through either of said first or second wires, parallel circuits each including one of said cams and its associated cam follower, each of said parallel circuits being connected to the output of said balance, the combination including a relay coil in each of said parallel circuits, said relay coils being successively operable depending upon the load on said balance, a normally closed contact associated with each of said coils, said normally closed contacts being connected in series in the first of said wires, a normally open contact associated with each of said coils, said normally open contacts being connected in parallel in the second of said wires, and a second normally closed contact associated with each of said coils except the last, said normally closed contacts being connected in the next succeeding parallel circuit in series with the cam.

4. In an electric balance having means for passing a current proportional to the weight applied to the balance, an indicating instrument having a multi-range scale and mask indicator associated therewith, a circuit for delivering the said current to the indicating instrument, a range changing motor connected to move said mask indicator, a plurality of cam followers connected to said motor, a cam associated with each of said cam followers, each of said cam followers contacting its associated cam over a portion of its travel with successive cam followers contacting their associated cams at spaced intervals as the motor rotates, a second circuit for supplying power to said motor, a third circuit including said cams and associated cam followers connected in parallel, and a motor connected to move said multi-range scale, the combination including means for positioning said indicator at a point intermediate the ends of said scale, means for interrupting the current flow to said instrument when no load is on the balance, means in said third circuit for operating said motor to rotate said cam followers and move from range to range on said indicating instrument successively until the correct range is selected, and means in said second circuit for interrupting the current flow to said second named motor until the correct range is selected.

5. In an electric balance having means for passing a current proportional to the weight applied to the balance, an indicating instrument having a multi-range scale and an indicator mask associated therewith, a circuit for delivering the said current to the indicating instrument, a motor for moving said scale, a second circuit for supplying current to said motor, a range changing motor, a plurality of cam followers connected to said second motor, a cam associated with each of said cam followers, each of said cam followers contacting its associated cam over a portion of its travel with successive cam followers contacting their associated cams at spaced intervals as the motor rotates, a third circuit for supplying power to said second motor, and a fourth circuit including said cams and associated cam followers connected in parallel, the combination including means for positioning said indicator mask at a point intermediate the ends of said scale, means for interrupting the current flow to said instrument when no load is on the balance, means in said fourth circuit for operating said second named motor to rotate said cam followers and move said indicator mask from range to range on said indicating instrument successively until the correct range is selected, and means in said third circuit for interrupting the current flow to said first motor until the correct range is selected.

6. In an electric balance having means for passing a current proportional to the weight applied to the balance, an indicating instrument having a scale and an indicator associated therewith, and a circuit for delivering the said current to the indicating instrument, the combination including an electric circuit for positioning said indicator at a point intermediate the ends of said scale when no load is on the electric balance, and means for closing said last named electric circuit when no load is on the electric balance and opening said circuit when a load is applied to the balance.

7. In an electric balance having means for passing a current proportional to the weight applied to the balance, an indicating instrument having a scale and an indicator associated therewith, and a circuit for delivering the said current to the indicating instrument, the combination including means for applying a force to position said indicator at a point intermediate the ends of said scale when no load is on the balance, and means for disconnecting said last named means from said indicator when a load is on the balance.

References Cited in the file of this patent

UNITED STATES PATENTS

| | | |
|---|---|---|
| 1,078,029 | Zimpel | Nov. 11, 1913 |
| 2,351,606 | Gold et al. | June 20, 1944 |
| 2,357,727 | Tate | Aug. 29, 1944 |
| 2,357,891 | Granberry | Sept. 12, 1944 |
| 2,662,223 | Brewer | Dec. 8, 1953 |
| 2,675,222 | Clark | April 13, 1954 |
| 2,733,911 | Thurston | Feb. 7, 1956 |